United States Patent Office 3,341,023
Patented Sept. 12, 1967

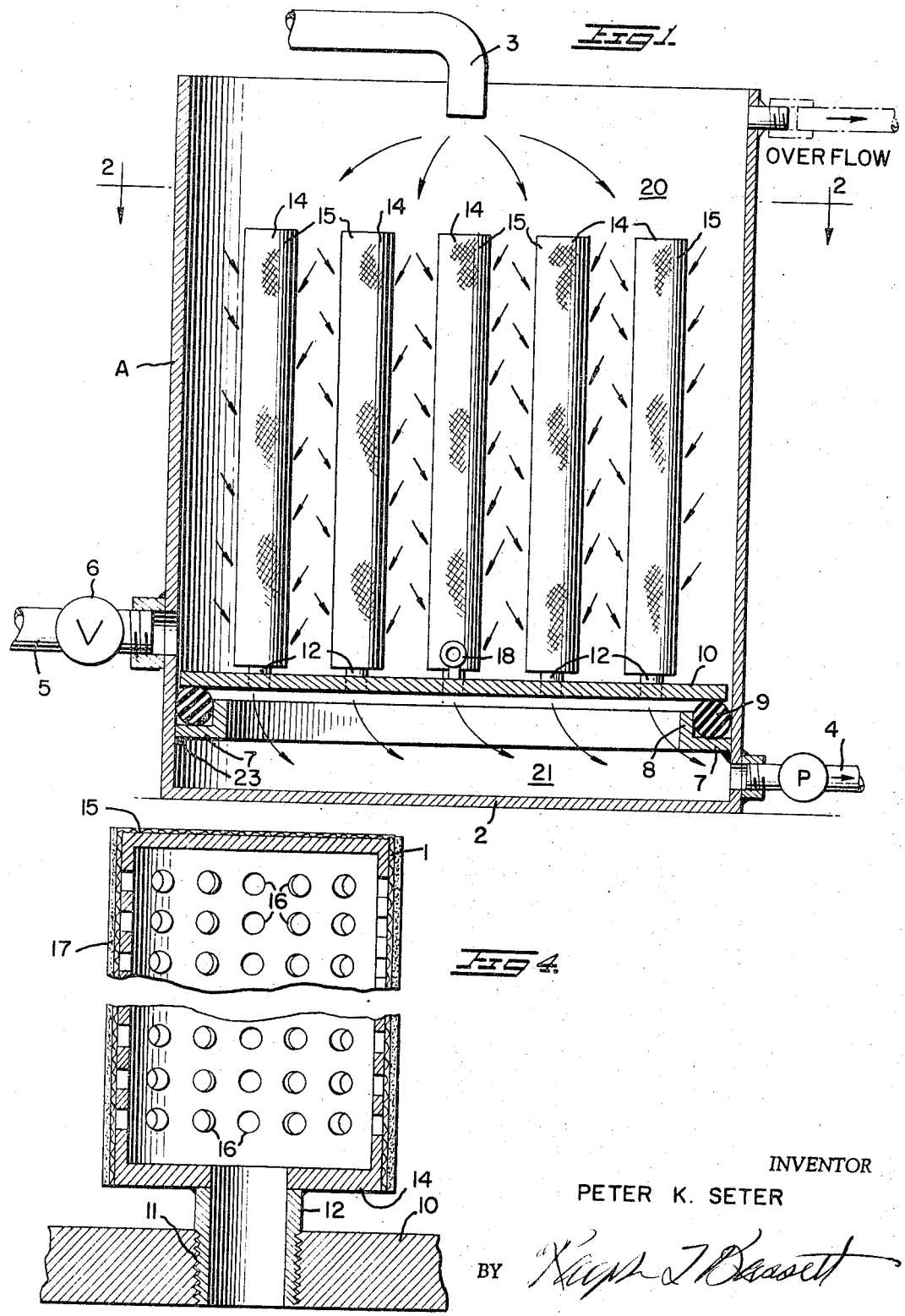

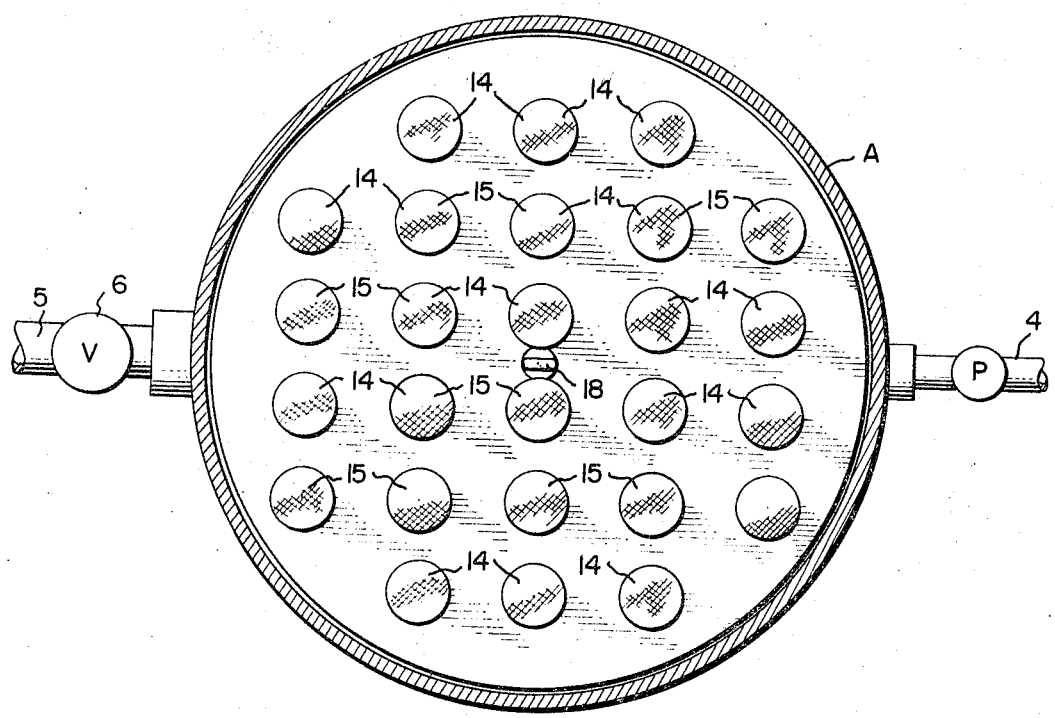
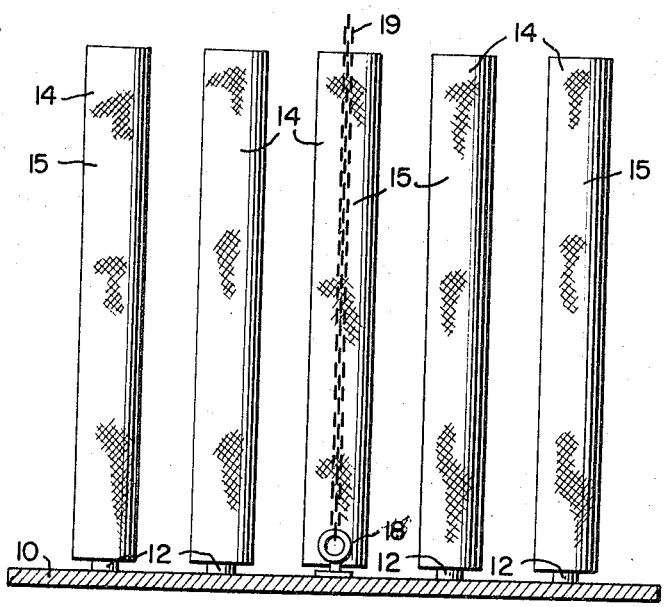

3,341,023
VACUUM FILTER ASSEMBLY
Peter K. Seter, 8017 N. Whitney Road,
Milwaukee, Wis. 53217
Filed Feb. 15, 1966, Ser. No. 527,573
4 Claims. (Cl. 210—237)

This invention relates to improvements in a vacuum filter system, and more particularly for use in the filtering of water in swimming pools and industrial plants.

Basically, the present invention comprehends a relatively simple filtering assembly containing individual filtering units which are removable per se and which are mounted as an assembly on a removable supporting base, whereby the individual units of the filtering system can be readily removed for replacement or repair of parts.

The main object of the invention is to provide a filtering assembly capable of handling any amount of waste water by appropriate arrangement of the individual units in series or parallel, and in instances where the waste water is discharged to the filter assembly either by gravity or by pump.

Another object of the invention is to provide a filtering unit comprising a plurality of vertical tubular filter elements which are individually removably mounted upon a supporting base or plate, the plate or base being removably supported within a tank or receptacle by means forming a seal.

These and other objects of the invention will more clearly hereinafter appear by reference to the accompanying drawings forming a part of the instant specification and wherein like characters of reference designate corresponding parts throughout the several views, in which:

FIG. 1 is a vertical section through a filtering assembly;

FIG. 2 is a transverse section on line 2—2 of FIG. 1;

FIG. 3 is a view showing the mounting plate and the filter elements removed from the receptacle; and FIG. 4 is an enlarged view showing the structure of one of the filter elements.

The present invention is suitable for use in any desired single or multiple arrangement for filtering waste water and the assembly comprises a tank A shown as cylindrical in form, although it may be of any desired configuration. The tank A is shown as open at its upper end with a closed bottom 2 and associated with the tank are essential connections including the inlet pipe 3 for discharging the unfiltered water or other fluid into the tank, a discharge pipe 4 which in use will be connected to a centrifugal pump to provide suction to force the filtering action and the flow of filtered water, and a clean-out connection 5 having a valve 6 which will be normally closed during operation of the assembly.

Adjacent the bottom 2 of tank A is welded a ring seat of angular cross-section having its horizontal leg 7 welded about the inner periphery of the tank at a point spaced from the bottom 2 and its vertical leg 8 defining with the horizontal leg 7 and the tank wall, a pocket in which is positioned an O-ring 9 having a diameter sufficient so that when the O-ring is in position it will project substantially above the vertical flange 8 of the angle member.

The filter assembly per se includes an annular base plate 10 of sheet form provided with a multiplicity of suitably arranged threaded openings 11 for receiving threaded nipples 12 which are welded or otherwise secured to the elongated tubular filtering septums 14 about which are closely fitted tubular casings or coverings 15 preferably formed of synthetic permeable material such as Orlon or polyethylene. The tubular septums 14 are provided with a plurality of perforations 16 so that water can be filtered through the walls of the coverings 15 and septums 14 for discharge through the nipples 12 by means of which the septums are mounted on the plate 10. The number of filter elements mounted on the plate 10 will depend upon their size, the volume of the inflow and the amount of work required of the assembly.

The tubular casings 15 which snugly seat about each of the individual septums are coated as shown by reference character 17 with a film of diatomaceous earth or other material which will be applied thereto in a manner to be hereinafter described.

A ring or hook 18 is secured centrally and at the top of plate 10 and a chain or cable 19 is attached thereto to enable appropriate hoisting means to lift the plate 10 and arrangement of filter elements off of its gasket 9 and out of the tank A so that a new assembly may be inserted in position, or parts substituted during a repair operation.

By the structure illustrated it will be obvious to one skilled in the art that the mounting plate 10 carrying the various removable filter elements, due to its sealing mounting on the gasket 9 provides upper and lower chambers 20 and 21, the upper chamber 20 receiving the initial flow of waste water or other unfiltered fluid through the inlet pipe 3 and the lower vacuum chamber 21 providing for the discharge of the filtered water or other material through the outlet pipe 4. The clean-out connection 5 is provided with the valve 6 and is for cleaning the upper chamber 20 by removing an accumulation of separated material and can be connected to a suitable drain sump, the discharge of the accumulated separated material being accomplished by any suitable well known flushing operation.

In use, one or more filtering assemblies will be provided in a suitable system and upon initial use of the device, diatomaceous earth or other material will be applied to the surface of the casings or coverings 15 by adding it to the surface of the water in the filter tank where it is carried by the water flowing toward the septums onto the casings 15, at which point it stops because it cannot get through the synthetic covering material 15. The water, after being filtered, flows from the discharge pipe 4 connected with the lower chamber 21 of the tank A and will be returned to its source, such as a swimming pool or industrial plant installation.

The equipment is versatile in that maintenance is possible by the simple operation of lifting the plate 10 from its annular gasket 9 seated in the channel formed by the annular ring 7–8. The gasket seat may be fitted into and secured to the inner face of the tank at a point appropriately spaced from its bottom 2 by a simple welding operation, as shown by the weld 23. In fact, all of the parts are simple in construction and convenient to install without the necessity of complicated machine operations and, likewise, and in the same manner the installation is such as to avoid the use of any complicated parts which would tend to interfere with continuous operation.

What is claimed is:

1. In a filtering apparatus comprising a tank defined by upright walls and a bottom closure, said tank being open at its top, an angle member positioned about the inner wall of said tank, said angle member including a horizontal leg having its end portion welded to the inner wall of the tank and an upright leg spaced from the wall of said tank to define a gasket seat, a gasket positioned in said seat of O-ring form in cross-section, said gasket having a diameter greater than the depth of the seat whereby it projects substantially above said vertical leg, a plate seated on said gasket defining an upper chamber and a lower chamber, said plate being formed with a plurality of openings for receiving a plurality of elongated septums, each septum comprising a tubular perforated body and a nipple extension at its bottom, said nipple extensions each being removably secured in an opening in said plate, a synthetic permeable tubular casing snugly fitting about each septum, a coating of filter aid on the outer surfaces of said tubular casings, an inlet for fluid to be filtered opening into said tank above said septums, a suction pipe connected to the lower chamber for discharging filtered fluid, a clean-out connection at the lower portion of said tank above said plate, and a valve for said clean-out connection.

2. The structure of claim 1 characterized in that the tank is of cylindrical form and the angle member is in the form of a hook.

3. The structure of claim 1 characterized in that an overflow is provided near the top of said tank.

4. The structure of claim 1 characterized in that the plate seated on the gasket and defining an upper chamber and a lower chamber is of less diameter than the inner diameter of the tank and means are provided for securing a hoist to said plate to facilitate removal of the plate and the elongated septums.

References Cited
UNITED STATES PATENTS

| | | | |
|---|---|---|---|
| 512,931 | 1/1894 | Aims | 210—323 |
| 1,404,667 | 1/1922 | Stevens | 210—237 |
| 2,657,808 | 11/1953 | Mankin | 210—323 X |
| 2,811,220 | 10/1957 | Winslow | 210—323 X |
| 2,921,686 | 1/1960 | Forman et al. | 210—323 |
| 3,037,634 | 6/1962 | Mills | 210—323 |

REUBEN FRIEDMAN, *Primary Examiner.*

C. DITLOW, *Assistant Examiner.*